United States Patent [19]

Richard

[11] 4,319,865

[45] Mar. 16, 1982

[54] WINDMILL

[76] Inventor: Joseph G. Richard, 357 South St., Hyannis, Mass. 02601

[21] Appl. No.: 50,169

[22] Filed: Jun. 20, 1979

[51] Int. Cl.³ .............................................. F03D 7/04
[52] U.S. Cl. ..................................... 416/41; 416/139; 416/196 A
[58] Field of Search ........... 416/132 B, 139 A, 138 R, 416/135 A, 43 A, 44 A, 51 A, 41, 196 A, 37

[56] References Cited

U.S. PATENT DOCUMENTS

| 26,345 | 12/1859 | Dickerson | 416/51 A |
|---|---|---|---|
| 282,122 | 7/1883 | Schramm | 416/88 |
| 650,032 | 5/1900 | Benson | 416/51 A |
| 693,481 | 2/1902 | Ziegler | 416/196 A |
| 779,514 | 1/1905 | Ziegler | 416/196 A |
| 963,335 | 7/1910 | Swanstrom | 416/41 |
| 1,033,351 | 7/1912 | Romans | 416/51 A |
| 1,038,657 | 9/1912 | Richard | 416/52 |
| 1,329,299 | 1/1920 | Foster | 416/44 A X |
| 1,334,485 | 3/1920 | Clipfell et al. | 446/51 A |
| 1,418,194 | 5/1922 | Melnick | 416/139 A |
| 1,713,866 | 5/1929 | D'Asseler | 416/196 A |
| 2,179,885 | 11/1939 | Fumagalli | 416/41 |
| 4,110,631 | 8/1978 | Salter | 416/189 A X |
| 4,111,601 | 9/1978 | Richard | 416/41 |
| 4,213,737 | 7/1980 | Gerhardt | 416/41 |

FOREIGN PATENT DOCUMENTS

| 47511 | 7/1933 | Denmark | 416/139 A |
|---|---|---|---|
| 455854 | 11/1928 | Fed. Rep. of Germany | 416/11 |
| 1036341 | 9/1953 | France | 416/11 |
| 182559 | 7/1922 | United Kingdom | 416/41 |

Primary Examiner—Everette A. Powell, Jr.
Attorney, Agent, or Firm—Maurice R. Boiteau

[57] ABSTRACT

There is disclosed in the present application a wind wheel having a set of movable vanes whose orientation with respect to the plane of the wheel is changed automatically to limit the speed to a safe level in winds of high velocity. The wheel is constructed and shipped in segments and is especially adapted for ease of assembly and truing for minimal eccentricity and lateral run-out.

7 Claims, 9 Drawing Figures

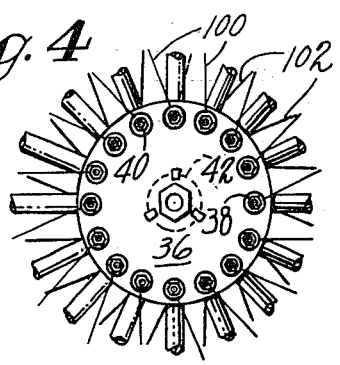
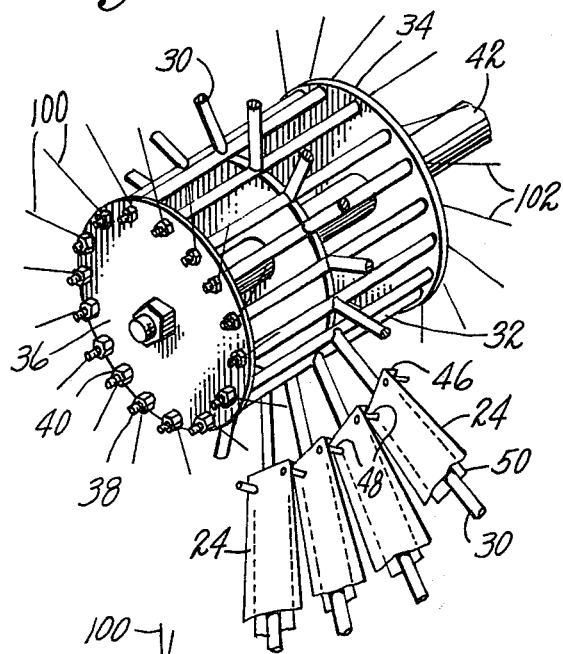
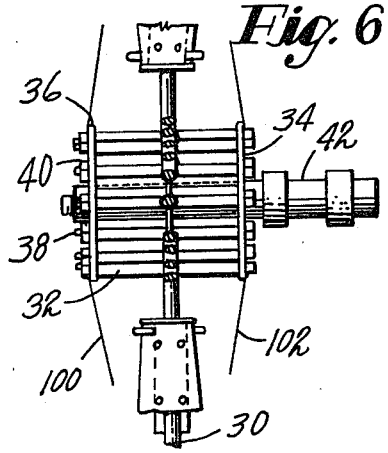
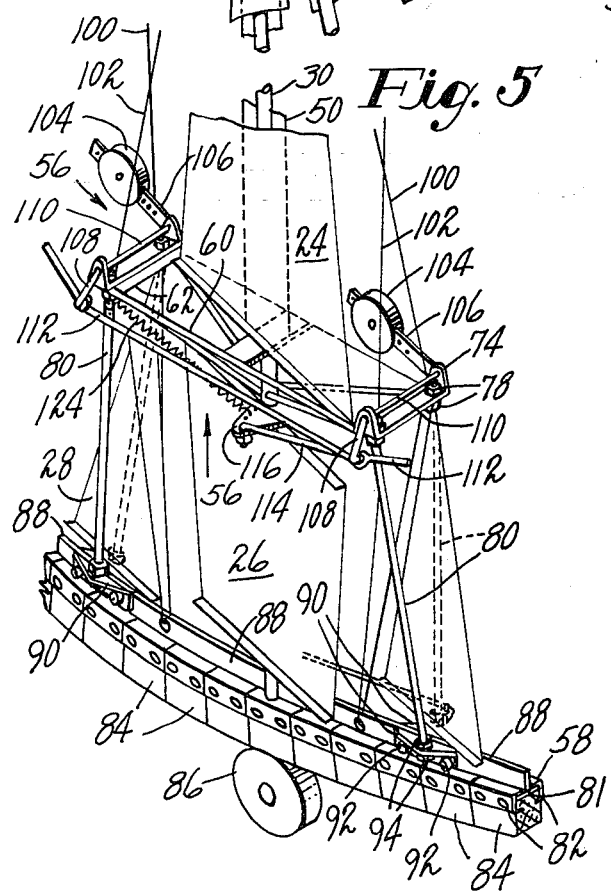
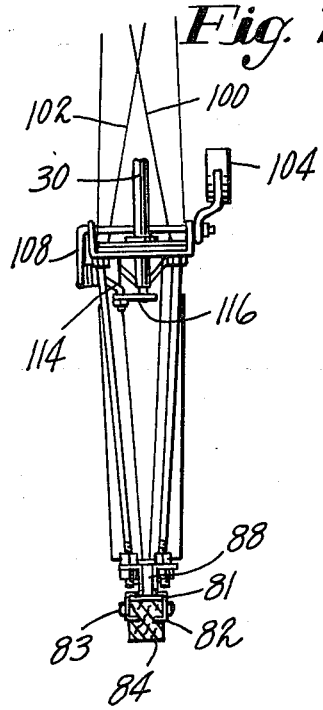

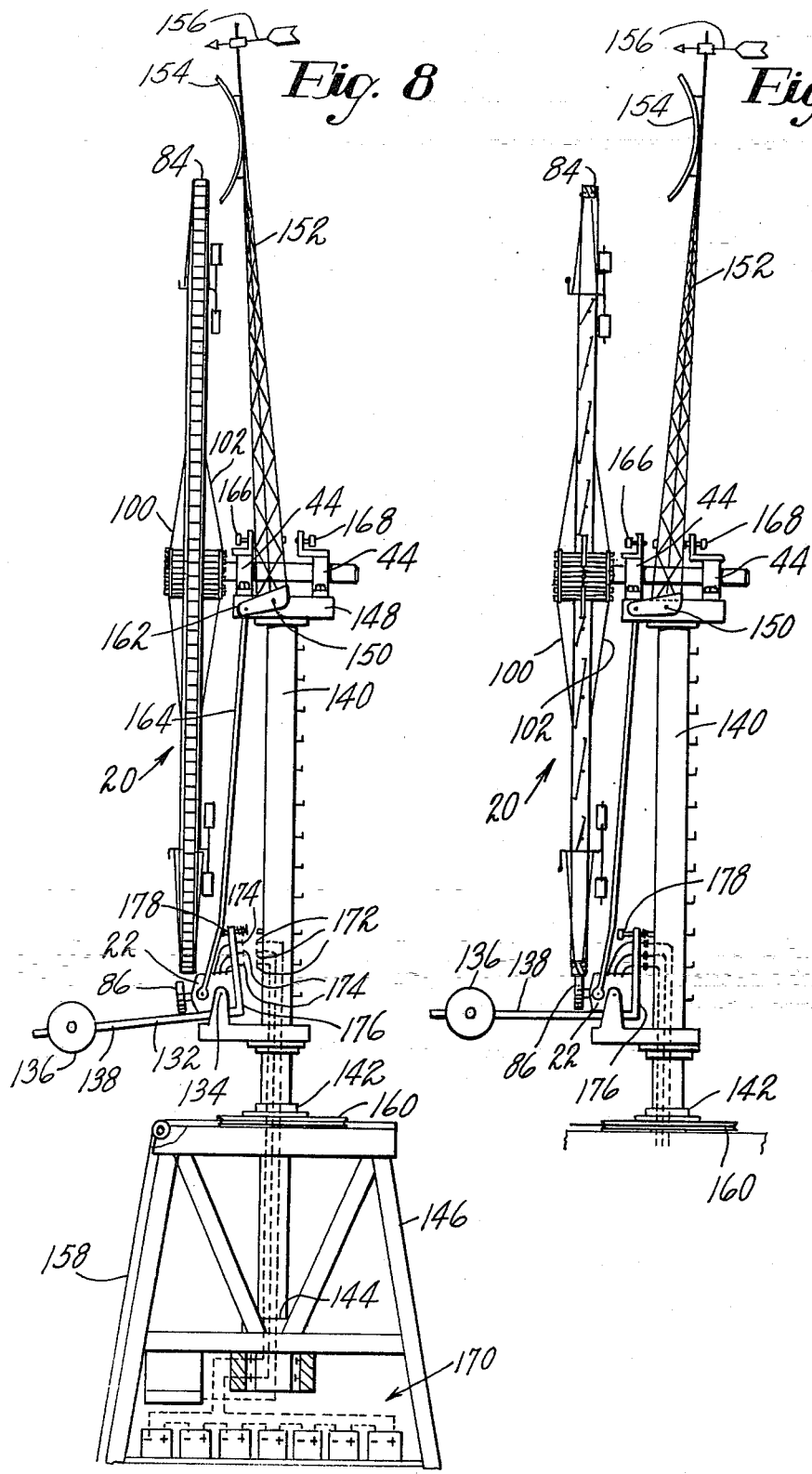

WINDMILL

The present invention relates generally to improvements in windmills and more particularly to self-regulating wind wheels adapted to be manufactured and shipped in segments for assembly at their operating sites and also including means for facilitating the truing of the wheel at assembly.

Pre-assembled wind wheels which may conveniently be shipped are frequently limited by the clearance of roads and bridges to somewhat small sizes. Beyond the smaller sizes which can be accommodated over highways and under bridges, it is necessary that wind wheels be shipped in segments. In such cases, it is highly desirable that the segments be easily assembled and that once assembled, be easily trued to minimize eccentricity and lateral run-out. The need for accurate truing is even more important when a tire at the periphery of the wheel is employed for frictional coupling directly to the work load, such as a generator or a pump.

In addition, the task of truing a self-regulating segmented wheel adapted to limiting its maximum speed is even more demanding because such a wheel generally includes a plurality of movable vanes which must be free for movement in the assembled wheel and thus adapted to perform their speed regulating function.

It is accordingly an object of the present invention to provide a wind wheel, particularly one of large diameter, which may conveniently be manufactured and shipped in segments for assembly at the operating site.

A further object of the invention is to facilitate the truing of such wind wheels after assembly.

Yet another object is to facilitate the truing of wind wheels which not only include movable speed regulating vanes but also a peripheral tire for coupling the wheel to the work load.

In the achievement of the foregoing objects, a feature of the invention relates to two sets of tie rods extending between a pair of spaced apart hub flanges and intermediate bridges. The two sets of tie rods cross, one set extending between a front hub flange and the rearward edge of the bridges and the other between a rear hub flange and the forward edge of the bridges. Adjustment of the tie rods thus changes not only the radial position of the bridges but also, since two tie rods connected to the front and rear of the bridge are anchored respectively to the rear and front hub flanges, changes the lateral position of the bridges.

According to a related feature, a sectioned rim is adjustably spaced outwardly from the bridges and carries a frictional tire to couple the wheel directly at its periphery to driven machines, typically generators or pumps. Truing of the rim and tire is accomplished by adjusting spacer bars extending radially between the bridges and the rim. In the interval between the bridges and the rim is a series of self-adjusting vanes, two in each wheel segment, for limiting the maximum speed of the wheel in high wind conditions.

The foregoing objects and features of the invention together with many advantages to be derived from its use will be more fully understood from the following detailed description of an illustrative embodiment taken in connection with the accompanying drawings in which:

FIG. 3 is a detail view in perspective showing a central hub section also forming a part of the wind wheel of FIG. 1;

FIG. 4 is a view in front elevation of the hub section depicted in FIG. 3;

FIG. 5 is a detail fragmentary view in perspective showing adjustable vanes and an outer portion of a blade forming a part of the wind wheel depicted in FIG. 1;

FIG. 6 is a view in side elevation showing the central portion of the wind wheel;

FIG. 7 is a view in side elevation on a reduced scale of a portion of the wind wheel depicted in FIG. 1; and FIGS. 8 and 9 are views in side elevation of a wind wheel showing a mechanism for coupling and uncoupling the load from the wheel shown respectively in FIGS. 8 and 9 as uncoupled and coupled to the wind wheel.

Figure 1:
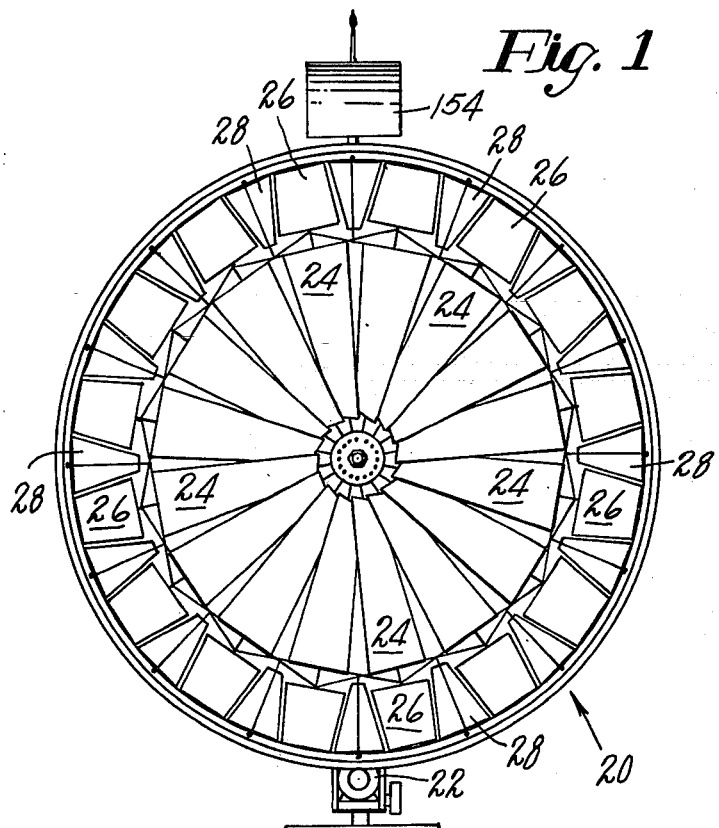
FIG. 1 is a view in front elevation of a wind wheel assembly according to the present invention.
Figure 2:
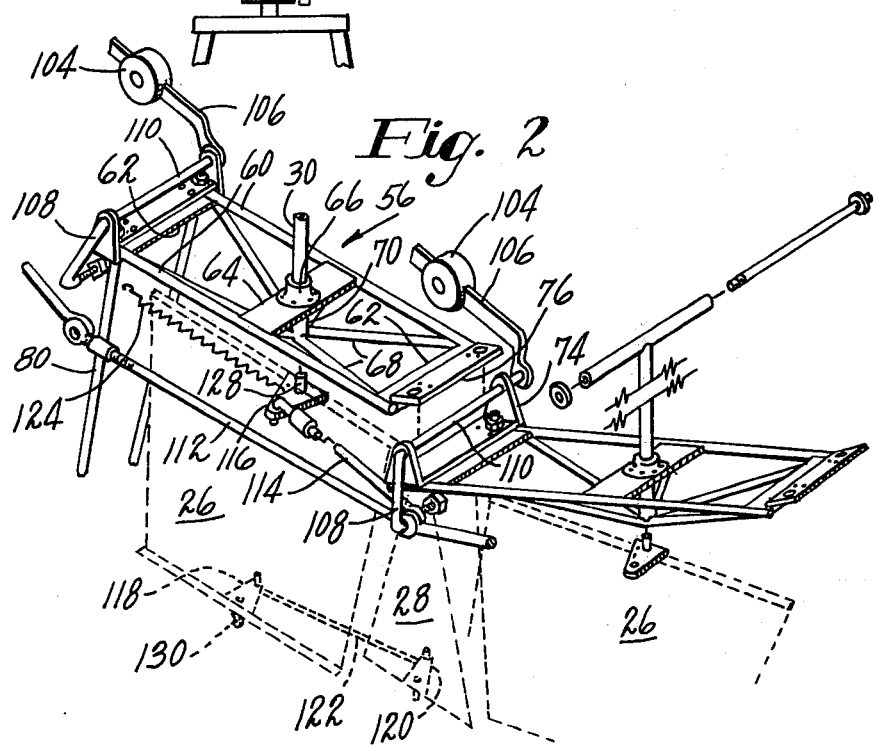
FIG. 2 is a fragmentary view in perspective and on an enlarged scale depicting an intermediate bridge structure forming a part of the wind wheel of FIG. 1.

Turning now to the drawings particularly FIGS. 1, 2 and 5, there is shown a windmill including a wind wheel indicated generally at 20 coupled at its periphery to a generator 22 and comprising sixteen segments each including a blade 24, a primary vane 26 and an auxiliary triangular vane 28. The blades 24 are fixed in a predetermined orientation to derive maximum power from the winds of the lowest velocity normally expected in the location where the wheel 20 is installed. In light winds, the vanes 26 and 28 are automatically oriented to assist the blades 24 in imparting rotary motion to the wheel 20 but as wind speed increases to a level which could be damaging to the wheel, the orientation of the vanes is changed automatically to counter the effect of the blades 24.

Each segment of the wind wheel 20 is pre-assembled on a T-shaped tubular supporting weldment including a radial support 30 extending outwardly from a perpendicular crosshead 32. Each weldment is joined to a central hub including inner and outer flanges 34 and 36 respectively, as best seen in FIG. 3. The crossheads 32 are clamped between the flanges 34 and 36 to which they are secured by threaded rods 38, one passing through each and being tightened at each end by a nut 40. The flanges 34 and 36 are keyed to a shaft 42 which is journaled in a pair of bearing blocks 44 shown in FIGS. 8 and 9. The inner end of each blade 24 is formed with an inturned lip 46 (FIG. 3) to provide transverse stiffness and the inner ends of the blades are accurately positioned in shingled relationship by spacer bushings 48 installed between the trailing edge of one blade and the leading edge of the adjacent one. Each blade is secured to its related radial support 30 by a shallow channel 50 secured to the vane 24 and disposed in embracing relationship around the support.

The structure provided in the present wheel for holding the adjacent segments together and for retaining each of the blades 24 against endwise displacement on its radial support 30 is shown in FIGS. 2 and 5 and comprises a bridge weldment indicated generally at 56. In addition to retaining the blades 24 and joining adjacent wheel segments, the bridges 56 also support a speed sensing mechanism to be described, provide pivotal mountings for the vanes 26 and 28 and support for segments of a rim 58. The weldment 56, as seen in FIG. 2, comprises longitudinal stretchers 60, end bars 62 and a central transverse plate 64 to which is secured a fitting 66 for receiving the outward end of the support 30. The stretchers 60 and the bars 62 together with the traverse plate 64 lie generally in a common plane defining the inner surface of the weldment which is reinforced on its outward side by angularly oriented bars 68 radiating from a central hub 70 coaxial with the fitting 66, to the corners of the weldment. Adjacent weldments are clamped together between a perforated bracket 74 and a clamp plate 76 by opposed check nuts 78 on the threaded inward end of rim supporting rods 80 shown in FIG. 5.

The rim 58, which as has already been pointed out, is segmented, is formed with a transversely flat tire-engaging exterior and provided with channel shaped retainers 82 which are secured by bolts 83 passing through wood blocks 84 to embrace the rim and fit in grooves on each side of the blocks which are arranged to present end grain at the periphery to engage a rubber-tired pulley 86 on the shaft of the generator 22. The blocks 84 may alternatively be replaced by blocks of fiberglass filled resin but at a higher cost. The blocks 84 are readily trued after the wheel has been assembled, using the wheel's own wind driven power, a simple tool rest and a wood turning tool. The sections of the rim 58 each include a central inner radial flange 88 joined in end to end relation with the adjacent segment by brackets one of which is shown at 90 in FIG. 5. The bracket 90 is perforated to receive bolts 92, one passing through opposed brackets 90 and one flange 88 while the other bolt passes through the flange of the adjacent rim segment 58. The outer ends of the rods 80 are received in appropriate openings in the brackets 90 between check nuts 94, which are adjusted along the axis of the rod 80 as the wheel is assembled to true the rim 58 both for concentricity and to minimize lateral run-out. In addition to varying the effective length of the rods 80, the position of the ends of the bridges 56 may also be adjusted both for distance from the axis of the shaft 42 and in the direction of the axis to obtain concentricity and to correct lateral run-out as will be explained later.

When the wheel 20 is assembled at the operating site, the position of the bridges 56 is adjusted by varying the length of tie rods 100 which extend from the outer flange 36 to the inner edge of the weldments 56 and tie rods 102 which extend from the inner flange 34 to the outer edge of the weldments 56 as seen in FIGS. 3 to 9 inclusive. By changing the effective length of the rods 100 and 102, not only is the distance of the weldments from the axis of the shaft 42 adjusted but so is the lateral position of the weldments in much the same way as loosening and tightening the spokes of a bicycle wheel change both the radial and lateral position of the rim. The inner ends of the rods 100 and 102 are anchored around the threaded rods 38 which secure the blade supports 30, 32 to the flanges 34 and 36. The orientation of the rods 100 and 102 includes a counterclockwise direction of the rods 100 and a clockwise direction of the rods 102 from their points of attachment on the flanges 36 and 34, both as seen from the front of the wind wheel 20. Thus, the rods 100 and 102 not only cross from front to rear in the wind wheel 20, but are also arrayed in opposite directions in the plane of the wheel so as to resist torque loads in either direction.

The speed of the wheel 20 is limited in high winds by a sensing mechanism which adjusts the orientation of the vanes 26 and 28 in accordance with wheel speed from an at rest position in which the vanes are positioned to impart maximum additive torque to the wheel from wind impinging upon them. As the wind and wheel speeds increase, the included angle between the vanes 26 and 28 and the plane of the wheel is first reduced thus providing less additive torque to the wheel until, at high wind velocities which could otherwise cause the wheel to reach destructively high speeds, the orientation of the vanes 26 and 28 is actually reversed so as to subtract from the torque imparted to the wheel by the action of the wind upon the blades 24. It is thus seen that the orientation of the vanes 26 and 28 not only assists in starting the wheel under light wind conditions but also prevents the wheel from reaching dangerously high rotational speeds. The sensing mechanism includes a set of interconnected weights, seen in FIG. 5 and mounted to be urged outwardly by centrifugal force which increases with the speed of the wheel. Each weight 104 is adjustably fixed on an arm 106 of a composite bellcrank including another arm 108, the two arms being mounted at opposite ends of a shaft 110 pivoted in upstanding ears of the bracket 74. All sixteen bellcranks, one in each wheel segment are interconnected by link rods 112 with the result that all of the weights 104 act together to adjust all of the vanes 24 and 26. The weights 104 are coupled to the vanes 26 by link rods 114, one extending from each pivotal connection between each arm 108 and the related rod 112, to a perforation in an ear 116 integral with the vane. A similar ear 118 at the opposite edge of the vane 26 is interconnected with an ear 120 on each auxiliary vane 28 by a link rod 122 so that both the vanes 26 and 28 move in unison. The centrifugal force acting upon the weights 104 is resisted by means of tension springs 124 that stretch between the ear 116 and one of the rods 80. Each vane 26 is provided with a pintle 128 adapted to being pivotally received in the hub 70 and an outer pintle 130 received in a suitable opening in a boss on the flange 88. Similarly each vane 28 is provided with pins which are received in suitable openings in the bar 76 and in the rim 188.

There is shown in FIGS. 8 and 9 a mounting for the generator 22 and a wind direction sensing mechanism which controls the orientation of the wind wheel. The mounting of the generator includes a platform 132 pivoted at 134 and urged downwardly by a counterweight 136 adjustably mounted on a forwardly extending arm 138 integral with the platform. The wind wheel 20 and the control mechanism are mounted on a rotatably supported column 140 journaled in bearings 142 and 144 in a pedestal 146. At the top of the column 140 is a platform 148 upon which the bearing blocks 44 for the wheel 20 are fixedly mounted. The platform 148 also provides a pivot 150 for a lever including an upwardly extending arm 152 which is topped by a sail 154. Shown mounted at the top of the sail is a wind direction sensor 156 which may be located elsewhere but whose function is to produce a directional signal for a mechanism which controls the orientation of the wind wheel by turning the column 140. Though not shown completely, the actuating mechanism for turning the column 140 includes a cable 158 which is connected to mechanism controlled by the signal of the wind direction sensor 156. For this purpose, the cable 158 passes over a pulley 160 fixed to the column 140 and also passes over a pulley of an actuating mechanism controlled by the sensor 156 and a manually operated pulley (neither shown) which may be used to overcome the automatic orientation mechanism when it is desired for any reason to stop the wind wheel from rotating. The lever including the vertical arm 152 includes a short horizontal arm 162 to the distal end of which, a vertical link rod 164 is pivotally connected. The lower end of the link rod 164 has a pivotal connection to the platform 132. The result is that when wind impinges upon the sail 154, the platform is lifted from the inactive position shown in FIG. 8 to the operating position shown in FIG. 9 in which the generator pulley 86 is brought into contact with the tire 84 at the periphery of the wind wheel 20. This mechanism allows the wind wheel 28 to start rotating under very light wind conditions since it does so under no load. The generator 22 is coupled to the wind wheel only when the wind is of sufficient intensity to drive the load. The extent of movement of the arm 152 is determined by abutment screws 166, 168 threaded into brackets on the bearing blocks 44 which limit the load disengaging and engaging position of the lever. If the wind wheel 20 is employed in conjunction with a set of batteries shown generally at 170 at the base of the pedestal 146 but in practice usually stored at a more remote protected location, three fixed electrical contacts 172 on the column 146 are engaged by movable spring loaded contacts 174 mounted on a vertical plate 176 integral with the platform 132. The engagement of the contacts 172 by the contacts 174 is controlled by a limit screw 178 threaded in the plate 176 and engaging a suitable fixed abutment on the column 146. The opening of the contacts 172, 174 thus prevents discharging of the batteries 170 through the generator 22 while the generator is decoupled from the wind wheel 20.

Having thus disclosed my invention, what I claim as new and desire to secure by Letters Patent of the United States is:

1. A windmill assembly including a wind wheel comprising a central hub formed with spaced apart front and rear flanges, a plurality of sub-assembly segments each generally in the form of a circular sector adapted to being assembled around the hub with similar segments to form a complete wheel assembly and each including a bridge connected to the bridges of adjacent segments and having front and rear edges oriented in the wheel assembly, a radial support extending from the hub and passing through a fitting on the bridge, an adjustably fixed blade mounted on the radial support and a primary movable vane pivotable on an axis in alignment with the radial support, laterally and radially adjustable means for securing the segments to the hub, the wind wheel further comprising a speed sensing mechanism including a plurality of interconnected weights each mounted on an arm pivoted for movement toward and away from the axis in the plane of the wheel, whereby speed related movement of the weights is translated into orientation of the vanes to reduce their torque input from the vanes to the wheel as wheel speed increases.

2. A windmill assembly according to claim 1 further comprising a segmented peripheral tire spaced radially outwardly from the bridge and a machine having a driven pulley in frictional engagement with the tire, the vanes and sensing mechanism being interposed in a space interval between the bridge and the tire.

3. A windmill assembly according to claim 1 further characterized in that the laterally and radially adjustable means comprises adjustable rods interconnecting the flanges and the bridges.

4. A windmill assembly according to claim 3 further characterized in that the rods are divided into two sets, one set extending from the front flange to the rearward edge of the bridges and the other set from the rear flange to the forward edge of the bridges, that rods from the two sets cross in an axial direction of the wheel and that the two sets are arrayed in opposite directions in the plane of the wheel.

5. A windmill assembly according to claim 1 further comprising a generator having a frictionally driven pulley, a pivotally supported platform upon which the generator is mounted, a tire at the periphery of the wheel and wind responsive means for urging the pulley into driving engagement with the tire.

6. A windmill assembly according to claim 5 further characterized in that the wind responsive means includes a sail, a lever arm supporting the sail and a linkage interposed between the lever arm and the platform.

7. A windmill assembly according to claim 6 further comprising an electrical circuit connected to the generator and a set of contacts in the circuit actuated by the wind responsive means to open under light wind conditions.

* * * * *